(12) United States Patent  (10) Patent No.: US 8,905,900 B1
Scaringi  (45) Date of Patent: Dec. 9, 2014

(54) EXERCISER MOWER

(76) Inventor: Barry Scaringi, Reamstown, PA (US)

( * ) Notice: Subject to any disclaimer, the term of this patent is extended or adjusted under 35 U.S.C. 154(b) by 379 days.

(21) Appl. No.: 13/537,738

(22) Filed: Jun. 29, 2012

Related U.S. Application Data

(60) Provisional application No. 61/505,500, filed on Jul. 7, 2011.

(51) Int. Cl.
*A63B 69/16* (2006.01)
*G05G 1/30* (2008.04)

(52) U.S. Cl.
USPC .................................................. 482/57; 56/2

(58) Field of Classification Search
USPC ............................................................ 56/2
See application file for complete search history.

(56) References Cited

U.S. PATENT DOCUMENTS

| | | | | |
|---|---|---|---|---|
| 1,713,396 A | * | 5/1929 | Rountree | 56/16.7 |
| 4,341,058 A | * | 7/1982 | Chun | 56/2 |
| 4,455,816 A | | 6/1984 | Porath | |
| 5,222,348 A | * | 6/1993 | Woodling | 56/2 |
| 5,274,987 A | | 1/1994 | Wiener | |
| 5,388,393 A | * | 2/1995 | Woodling | 56/2 |
| 2009/0156377 A1 | * | 6/2009 | Brown | 482/110 |
| 2011/0232254 A1 | * | 9/2011 | Ju et al. | 56/249 |

* cited by examiner

*Primary Examiner* — S R Crow
(74) *Attorney, Agent, or Firm* — Hooker & Habib, P.C.

(57) ABSTRACT

A manually powered, pedal-powered exerciser mower includes a frame, a mower assembly mounted to the front of the frame, and a pedal-operated chain drive that drives the mower in both forward and rear directions. A movable kickstand raises the rear of the mower so that the mower may also be used as a stationary exercise bicycle. A brake enables the user to selectively vary pedaling resistance when the mower is used as a stationary exercise bicycle but the brake can also be applied while mowing.

19 Claims, 5 Drawing Sheets

EXERCISER MOWER

FIELD OF THE INVENTION

The invention relates to a manually powered, pedal-powered exerciser mower that uses no hydrocarbon fuel or electricity and emits no pollutants. The exerciser mower can be used as a lawn mower to cut grass or other ground cover, or as a stationary exercise bike.

BACKGROUND OF THE INVENTION

Pedal-operated lawn mowers are known.

A first set of pedal-operated lawn mowers have a frame that includes a steerable front wheel. A mower assembly trails the front wheel. See for example Porath, U.S. Pat. No. 4,455,816 and Chun, U.S. Pat. No. 4,341,058. The front wheel compresses down a strip of uncut grass prior to cutting, resulting in a strip of uncut or poorly cut grass being left behind. The lawn mower can also slide and be difficult to turn in wet grass due to turning forces being generated by a single wheel.

Woodling, U.S. Pat. No. 5,388,393 discloses a pedal-operated lawn mower in which the mower assembly is attached to the front forks of a conventional bicycle whose front tire has been removed. The resulting lawn mower eliminates the problem of uncut grass but turning causes the mower assembly to urge tipping of the bicycle frame to one side. Furthermore, conventional bicycles that would be adapted for use cannot operate in reverse, making it impossible for the lawn mower to back out from under trees or bushes.

Chun further teaches that a pedal-operated lawn mower can also be used as a stationary exercise bike, an advantageous feature. However when the lawn mower disclosed in Chun is used as a stationary exercise bike, pedaling causes the cutting blades to also turn. This poses a safety hazard.

Thus there is a need for an improved pedal-operated lawn mower that can also be adapted for use as a stationary exercise bike. The improved lawn mower should cut the grass without leaving strips of uncut grass, should be stable in turns without the frame being urged to tip, and when used as a stationary exercise bike the mower cutting blades should remain stationary.

SUMMARY OF THE INVENTION

The invention is an improved pedal-operated lawn mower that can also be used as a stationary exercise bike. The improved pedal-operated lawn mower cuts the grass without leaving strips of uncut grass, is stable in turns, and when used as a stationary exercise bike the cutting blades remain stationary.

A pedal-operated lawn mower in accordance with the present invention for cutting grass or other ground cover includes a frame having front and rear portions spaced apart along a longitudinal axis. A drive assembly includes a rear axle rotatably mounted to the rear portion of the frame, the rear axle carrying a rear wheel non-rotatably connected to the rear axle for conjoint rotation with the rear axle. Pedals are rotatably mounted to the frame, and a first drive operatively connects the pedals to the rear axle. The pedals are rotatable about a lateral axis of rotation to drive the rear axle, the lateral axis and the longitudinal axis defining a horizontal plane.

A steerer assembly rotatably mounted to the front portion of the frame is rotatable about a vertical axis perpendicular to the horizontal plane, and a mower assembly is nonrotatably attached to the steerer assembly. The mower assembly has cutting blades, a pair of front wheels, and a cutting drive operatively connecting the pair of front wheels with the cutting blades so that rotation of the front wheels drives the cutting blades. The front wheels and the rear wheel are configured to support the frame on a horizontal surface.

The vertical steering axis enables the mower to be steered for turning without the mower assembly urging the frame to tip over. The mower assembly is mounted to the front of the frame, allowing the cutting blades to cut grass that has not been compressed by a front wheel as in some conventional pedal-operated mowers. The pedal drive allows the user to pedal in either forward or reverse so that the mower can cut up to a fence or beneath shrubs and trees and yet can be backed up without the user getting off the mower.

In a preferred embodiment of the invention the mower assembly is a reel-type mower assembly having a cutting blade that rotates about a horizontal axis, and the mower includes a pair of back wheels, the wheels spaced apart on opposite sides of the frame. The mower assembly and the pair of wheel wheels provide a stable base to resist tipping of the mower during use. In a further preferred embodiment the mower assembly is longitudinally spaced away from the frame for a longer wheelbase and even greater stability.

In further preferred embodiments the mower includes a kickstand that raises the rear wheel or wheels of the mower to enable the mower to be used as a stationary exercise bicycle. The cutting blades do not move while the mower is being used as a stationary exercise bicycle.

In yet further preferred embodiments the mower includes an adjustable brake that enables a user to adjust resistance to pedaling while the mower is being used as a stationary exercise bicycle. The brake can also be used to provide braking force while mowing, which can be useful for downhill grades.

The brake is preferably a prony brake in which a flexible member is pressed against the outer periphery of a disk carried on the rear axle. The prony brake provides a relatively uncomplicated mechanical brake that can be used when pedaling in either forward or backward directions, and offers a wide range of adjustment.

Other objects and features of the invention will become apparent as the description proceeds, especially when taken in conjunction with the accompanying drawing sheets illustrating an embodiment of the invention.

BRIEF DESCRIPTIONS OF THE DRAWINGS

DESCRIPTION OF A PREFERRED EMBODIMENT

Figure 1:
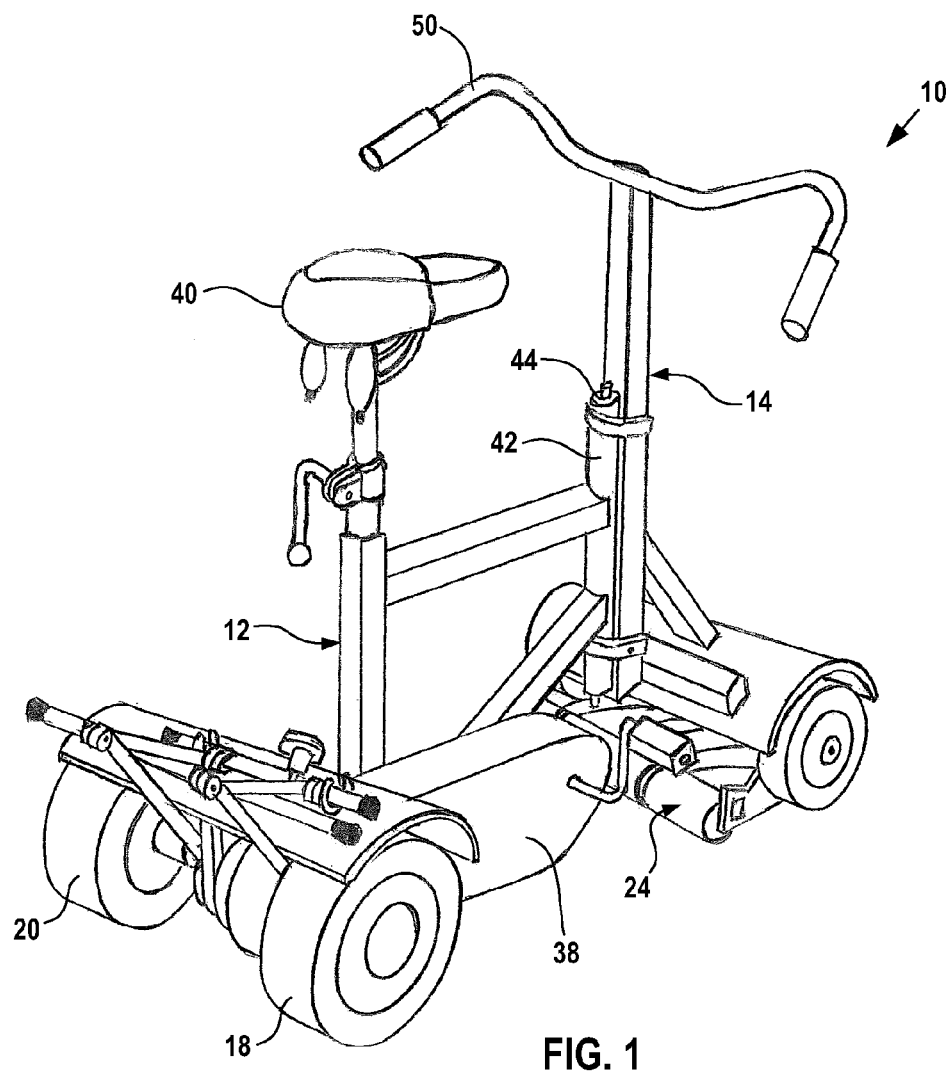
FIG. 1 is a right-rear perspective view of an exerciser mower in accordance with the present invention.

FIGS. 1-4 illustrate an exerciser mower 10 in accordance with the present invention. The exerciser mower 10 includes a frame 12, a steerer assembly 14 attached to a front portion of the frame 12, and a drive assembly 16 that includes a pair of rear wheels 18, 20 mounted to a rear axle 22 carried on a rear portion of the frame 12. A mower assembly 24 is attached to a lower end of the steerer assembly 14. The rear wheels 18, 20 and the mower assembly 24 support the frame 12 on a horizontal surface represented by the line 26, which line 26 can represent the horizontal surface or plane of a lawn to be cut by the exerciser mower 10. The rear wheels 18, 20 are located on opposite sides of the frame 12 and spaced from the frame 12 to cooperate with the mower assembly 24 in forming a stable base that resists tipping of the frame 12.

The drive assembly 14 includes a pair of pedals 28 carried on the frame 12 for rotation about a lateral axis perpendicular to the longitudinal axis of the frame 12. The pedals 28 drive a front sprocket 30 that in turn drives a rear sprocket 32 carried on the rear axle 22 via a bicycle roller chain 34. Additional idler sprockets, such as the idler sprocket 36, can be provided along the chain path. Preferably the chain 34 is enclosed within a chain guard 38.

The pedals 28 can rotate in forward and reverse directions to enable driving the mower 10 in either forward or reverse directions. The height of a seat 40 carried on the frame 12 is preferably adjustable to permit comfortable positioning of the user's feet on the pedals 28.

The frame 14 includes a fixed, vertically oriented head tube located at the front of the frame. The head tube 42 cooperates with the steerer assembly 14 to enable steering of the exerciser mower 10. The steerer assembly 14 includes a head set similar to the conventional head set used for bicycles housed in the head tube 42, the head set including a steerer tube 44 rotatable within the head tube 42. The steerer tube 44 rotates about a vertical steering axis that is perpendicular to the horizontal plane defined by the lateral and longitudinal axes and is also perpendicular to the plane 26. A pair of elongate arms 46 fixed to the upper and lower ends of the steerer tube 44 carry a vertical support member 48. The support member 48 is spaced from the head tube 42 to enable conjoint rotation or revolution of the member 48 with the steerer tube 44 about the vertical steering axis. A set of handlebars 50 is attached to the top of the vertical member 48.

The mower assembly 24 is attached to the bottom end of the vertical member 48 via a horizontal support member 52 that spaces the mower assembly 24 away from the frame 12, thereby cooperating with the rear wheels 18, 20 to provide a longer wheelbase for greater stability of the exerciser mower 10. The mower assembly 24 revolves about the vertical steering axis with rotation of the support member 48, thereby enabling steering of the exerciser mower 10.

The mower assembly 24 is similar to that used in a conventional reel-type manual lawnmower and includes a pair of spaced apart front wheels 54, 56 and a set of reel-type cutting blades 58 extending between the wheels 54, 56. When the wheels 54, 56 are rolling, the cutting blades 58 revolve about a horizontal axis. A conventional cutter height adjustment device 60 is used for adjusting the length of cut.

The mower assembly 24 further includes a front wheel guard 62 that partially extends around the cutting blades 58 and a rear wheel guard 64 attached to the frame 12 that partially extends around the rear axle 22.

Figure 2:
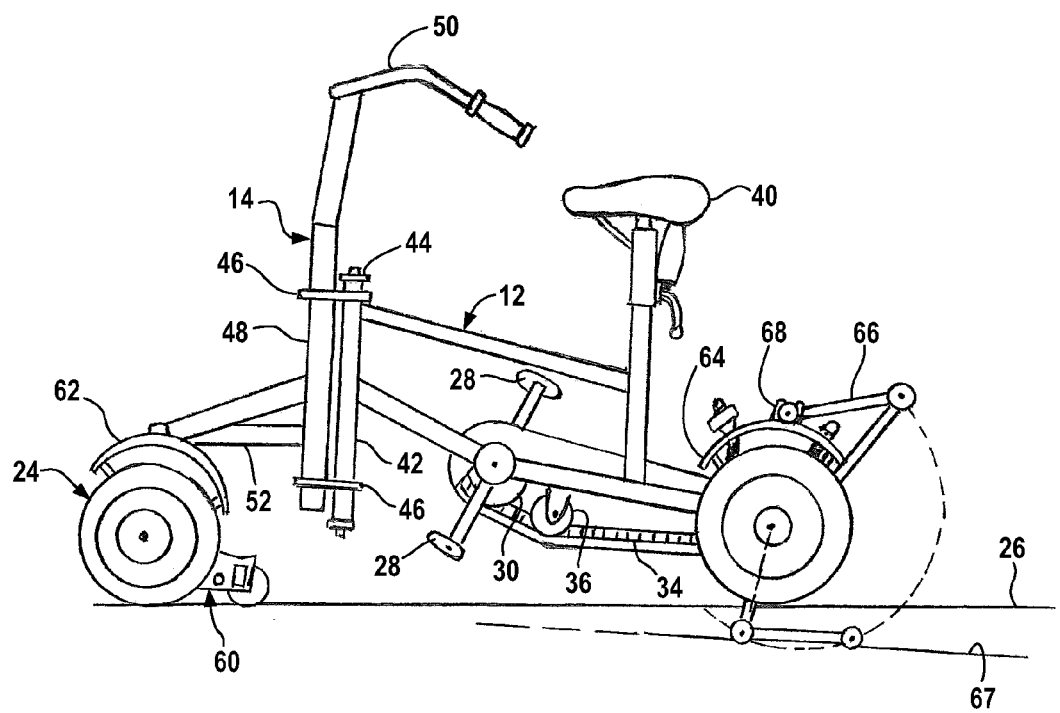
FIG. 2 is a left side view of the exerciser mower shown in FIG. 1 with a portion of the chain guard broken away.
Figure 3:
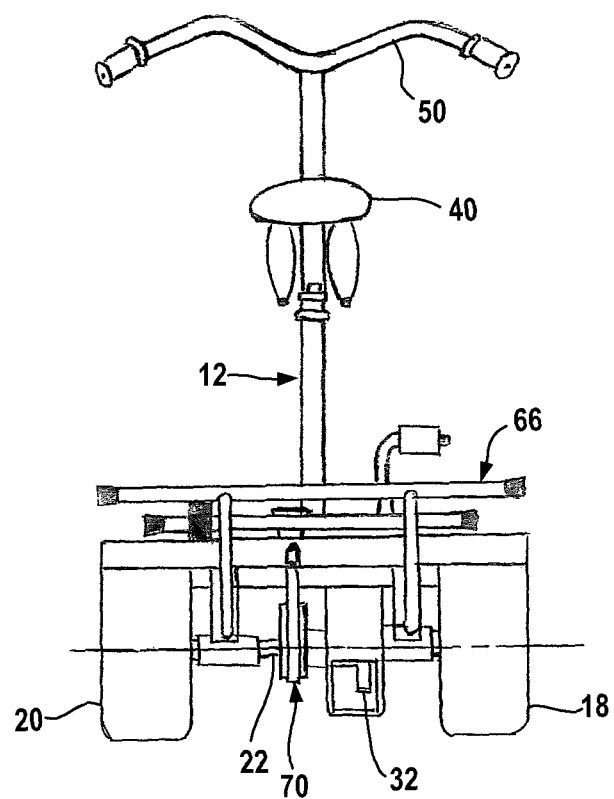
FIG. 3 is a rear view of the exerciser mower shown in FIG. 1.
Figure 4:
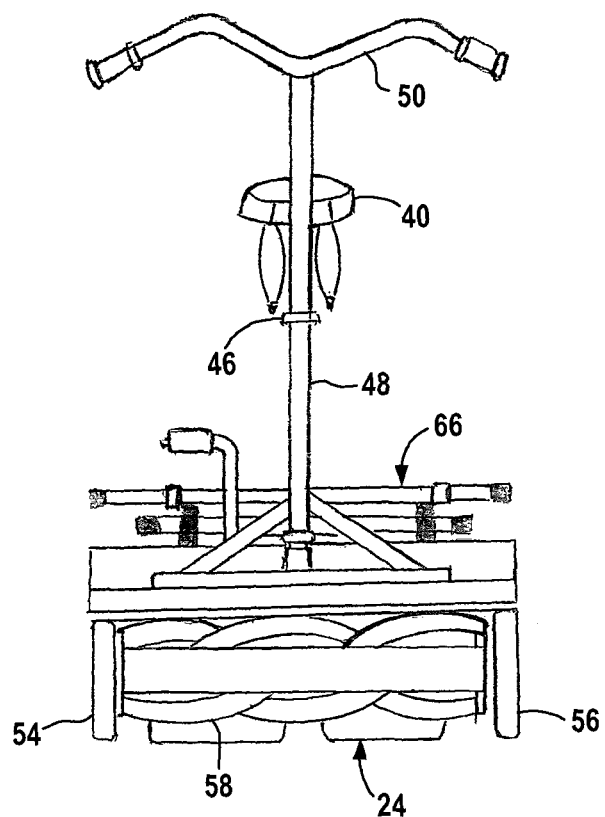
FIG. 4 is a front view of the exerciser mower shown in FIG. 1.

In operation as a mower cutting grass or other ground cover, the exerciser mower 10 is driven forward (to the left as shown in FIG. 2) by rotating the pedals 28. This causes the front wheels 52, 54 to roll and drive the cutting blades 58. The mower assembly 24 is in front so that the cutting blades 58 receive undisturbed and uncompressed grass for efficient cutting. The front wheels 52, 54 and the rear wheels 18, 20 have sufficient track width and wheelbase to form a stable base wheelbase that resists tipping or instability during operation.

Turning the handlebars 50 turns the mower assembly 24 to the left or right for going around turns. The vertical steering angle enables the exerciser mower 10 to turn easily without the mower assembly 24 urging the frame 12 to tip or otherwise become unstable. The relatively wide track of the front wheels 54, 56 provides good tracking around turns and resists slipping in wet grass as compared to single-wheel steering.

If an obstacle is reached, the exerciser mower 10 can move in reverse merely by pedaling in the opposite direction. This allows the exerciser mower 10 to trim efficiently under trees or shrubs or to react to hazards such as pets that might get in the way of the mower 10.

The exerciser mower 10 also includes features that enable the mower to function as an effective stationary exercise bike. A kickstand 66 is pivotally mounted to the frame and is movable between a retracted position shown in FIG. 2 for when the exerciser mower 10 is used as a mower to an extended position shown in phantom in FIG. 2 for when the exerciser mower 10 is used as a stationary exercise bike. When in its extended position the kickstand 66 raises the rear wheels 18, 20 and supports the rear portion of the frame 12 on a horizontal surface represented by the line 67. A retainer 68 carried on the rear wheel guard 64 releasably holds the kickstand 66 in its retracted position.

Figure 5:
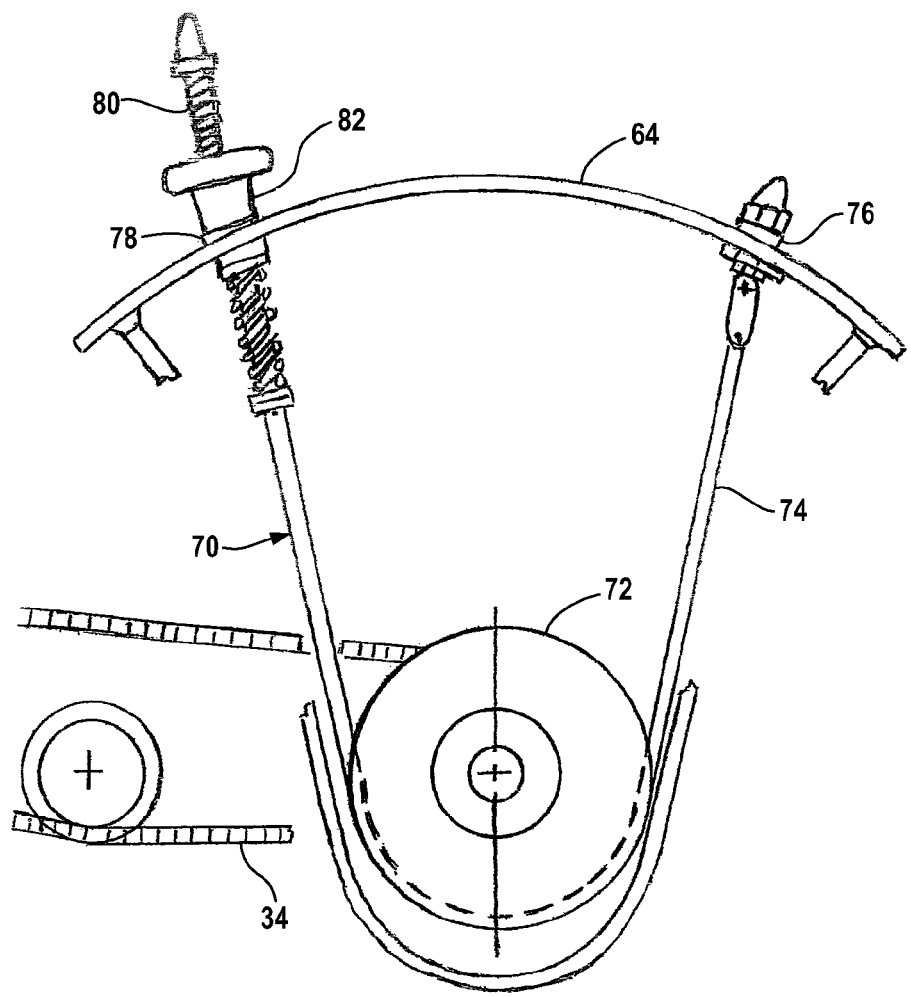
FIG. 5 is an enlarged side view of the prony brake used in the exerciser mower shown in FIG. 1.

A brake system 70 enables a user to selectively apply torque resisting rotation of the rear axle 22. An enlarged side view of the brake system 70 is shown in FIG. 5. The illustrated brake system 70 is a prony brake that enables the user to selectively vary the resistance applied to the rear axle 22.

The prony brake 70 includes a coaxial pulley or disk 72 nonrotably attached to the rear axle 22. A flexible, elongate belt 74 extends around the outer circumference of the disk 72 and is closely spaced from the disk 72. One end of the belt 74 is attached to a fixed anchor 76 carried on the rear wheel guard 64 and the other end of the belt 74 is attached to an adjustable anchor 78 also carried on the rear wheel guard 64. The adjustable anchor has a generally radially-aligned threaded rod 80 carried in the threaded bore of a rotatable tension adjustment nut 82. The belt 74 is attached to the radially-inner end of the rod 82. Rotating the nut 80 moves the rod 82 to tighten or loosen the belt 74 against the disk 72. To resist slipping of the belt 74 off the disk 72 and to increase available friction area, the belt 74 is a V-belt received in a corresponding circumferential V-notch in the disk 72.

The prony brake 70 is configured to enable a user to sufficiently loosen the brake 70 so that no resistive torque is applied to the disk 72 when the exerciser mower 10 is used as a mower, yet enables the user to selectively apply the desired resistance when the exerciser mower 10 is used as a stationary exercise bike.

During operation as a stationary exercise bike, the pedals 28 can be rotated in either direction as desired for exercise. The kickstand 66 and the front wheels 52, 54 form a stable base that resists tipping of the frame 12. The front wheels 52, 54 remain stationary and the cutting blades 58 remain stationary during exercise.

During operation of the exerciser mower 10 as a mower, a user can apply braking torque to the rear axle by utilizing the prony brake 70. This can be helpful, for example, when going downhill.

The illustrated braking system 70 is a prony brake. Other braking systems that apply selective resistance are known in the stationary exercise bike art and can be applied to the mower 10. Preferably such alternative braking systems should also be usable to selectively apply braking when the exerciser mower 10 is used as a mower. Alternatively, a separate braking system could be provided for dedicated use while mowing. For example, the rear axle 22 could include a disk brake actuated by a handle grip carried on the handlebars 50.

In yet other embodiments rolling the mower assembly 24 can include gearing in which rolling the front wheels 52, 54 rotates cutting blades around a vertical axis of rotation for cutting instead of around a horizontal axis.

While this disclosure has illustrated and described one or more embodiments of the invention, it is understood that this is capable of modification, and that the invention is not limited to the precise details set forth, but includes such changes and alterations as fall within the purview of the following claims.

What is claimed as the invention is:

1. A manually pedal-powered mower apparatus for cutting grass or other ground cover, the mower apparatus comprising:
 a frame comprising front and rear portions spaced apart along a longitudinal axis;
 a drive assembly comprising a rear axle rotatably mounted to the rear portion of the frame, the rear axle carrying a rear wheel non-rotatably connected to the rear axle for conjoint rotation with the rear axle, pedals rotatably mounted to the frame, and a first drive operatively connecting the pedals to the rear axle, the pedals rotatable about a lateral axis of rotation to drive the rear axle, the lateral axis and the longitudinal axis defining a horizontal plane;
 a steerer assembly rotatably mounted to the front portion of the frame, the steerer assembly rotatable about a vertical axis perpendicular to the horizontal plane;
 a mower assembly nonrotatably attached to the steerer assembly, the mower assembly comprising cutting blades, a pair of front wheels, and a cutting drive operatively connecting the pair of front wheels with the cutting blades wherein rotation of the front wheels drives the cutting blades; and
 the front wheels and the rear wheel configured to support the frame on a horizontal surface.

2. The mower apparatus of claim 1 comprising a braking system operatively connected to the drive assembly, the braking system configured to selectively apply retarding torque to the rear axle.

3. The mower apparatus of claim 2 wherein the braking system comprises a prony brake.

4. The mower apparatus of claim 1 wherein the pedals can be selectively rotatable in opposite first and second directions of rotation about the lateral axis, the rear axle rotating in a first direction when the pedal rotate in the first direction and the rear axle rotating an opposite second direction when the pedals rotate in the second direction.

5. The mower apparatus of claim 1 wherein the cutting blades are reel-type cutting blades.

6. The mower apparatus of claim 1 wherein the rear wheel represents a first rear wheel and the drive assembly comprising a second rear wheel nonrotatably connected to the rear axle, the first and second rear wheels on opposite sides of the frame.

7. The mower apparatus of claim 1 comprising a kickstand attached to the frame, the kickstand movable between extended and retracted positions, the kickstand configured to support the rear portion of the frame on a horizontal surface and space the rear tire from the horizontal surface when in the extended position and spaced away from the horizontal surface when in the raised position.

8. A manually-powered lawn mower comprising:
 a frame comprising front and rear portions spaced apart along a longitudinal axis;
 a drive assembly comprising a rear axle rotatably mounted to the rear portion of the frame, the rear axle carrying first and second rear wheels non-rotatably connected to the rear axle for conjoint rotation with the rear axle, the rear wheels on opposite sides of the frame, pedals rotatably mounted to the frame, and a chain drive operatively connecting the pedals to the rear axle, the pedals selectively rotatable in opposite directions about a lateral axis of rotation to drive the rear axle in both forward and rearward directions of rotation, the lateral axis and the longitudinal axis defining a horizontal plane;
 a braking system operatively connected to the drive assembly, the braking system configured to selectively apply torque resisting rotation of the rear axle;
 a steerer assembly rotatably mounted to the front portion of the frame, the steerer assembly rotatable about a vertical axis perpendicular to the horizontal plane;
 a mower assembly nonrotatably attached to the steerer assembly, the mower assembly comprising cutting blades that are rotatable about a cutting axis;
 the rear wheels and the mower assembly configured to support the frame on a horizontal surface.

9. The lawn mower of claim 8 wherein the cutting axis is oriented parallel with the horizontal plane.

10. The lawn mower of claim 8 wherein the mower assembly comprises a pair of spaced apart, rotatable front wheels, the front wheels and the rear wheels configured to support the frame on a horizontal surface, the mower assembly comprising a cutter drive operatively connected between the front wheels and the cutter blades to rotate the cutter blades with rotation of the front wheels.

11. The lawn mower of claim 8 wherein the braking system comprises a first friction member disposed on the rear axle that rotates with the rear axle and a movable second friction member that is selectively engageable with the first friction member.

12. The lawn mower of claim 11 wherein the first and second friction members form portions of a prony brake.

13. An exerciser mower comprising:
 a frame comprising front and rear portions spaced apart along a longitudinal axis;
 a drive assembly comprising a rear axle rotatably mounted to the rear portion of the frame, the rear axle carrying a rear wheel non-rotatably connected to the rear axle for conjoint rotation with the rear axle, pedals rotatably mounted to the frame, and a chain drive operatively connecting the pedals to the rear axle, the pedals selectively rotatable in opposite directions about a lateral axis of rotation to drive the rear axle in both forward and rearward directions of rotation, the lateral axis and the longitudinal axis defining a horizontal plane;
 a braking system operatively connected to the drive assembly, the braking system configured to selectively apply torque resisting rotation of the rear axle;
 a steerer assembly rotatably mounted to the front portion of the frame, the steerer assembly rotatable about a vertical axis perpendicular to the horizontal plane;
 a mower assembly nonrotatably attached to the steerer assembly, the mower assembly comprising movable cutting blades that are not mechanically connected to the drive assembly;
 a kickstand attached to the frame, the kickstand movable between extended and retracted positions;
 the mower assembly and the rear wheel configured to support the frame on a horizontal surface when the kickstand is in the retracted position;
 the kickstand configured to support the rear portion of the frame on a horizontal surface and space the rear wheel from the horizontal surface when the kickstand is in the extended position whereby rotating the rear wheel does not cause movement of the cutting blades.

14. The exerciser mower of claim 13 wherein the mower assembly comprises a pair of spaced-apart front wheels, the front wheels and the rear wheel configured to support the frame on a horizontal surface when the kickstand is in the retracted position.

15. The exerciser mower of claim 13 wherein the rear wheel represents a first rear wheel and the drive assembly comprising a second rear wheel non-rotatably connected to the rear axle, the first and second rear wheels on opposite sides of the frame.

16. The exerciser mower of claim 15 wherein the brake assembly comprises a rotating member nonrotably connected to the rear axle and a relatively movable second member that is selectively engageable against the rotating member.

17. The exerciser mower of claim 16 wherein the rotating member and the second member form a portion of a prony brake.

18. The exerciser mower of claim 13 wherein the steerer assembly comprises handlebars.

19. The exercise mower of claim 13 comprising a seat attached to the frame, the position of the seat relative to the pedals being selectively adjustable by a user.

* * * * *